Patented May 1, 1923.

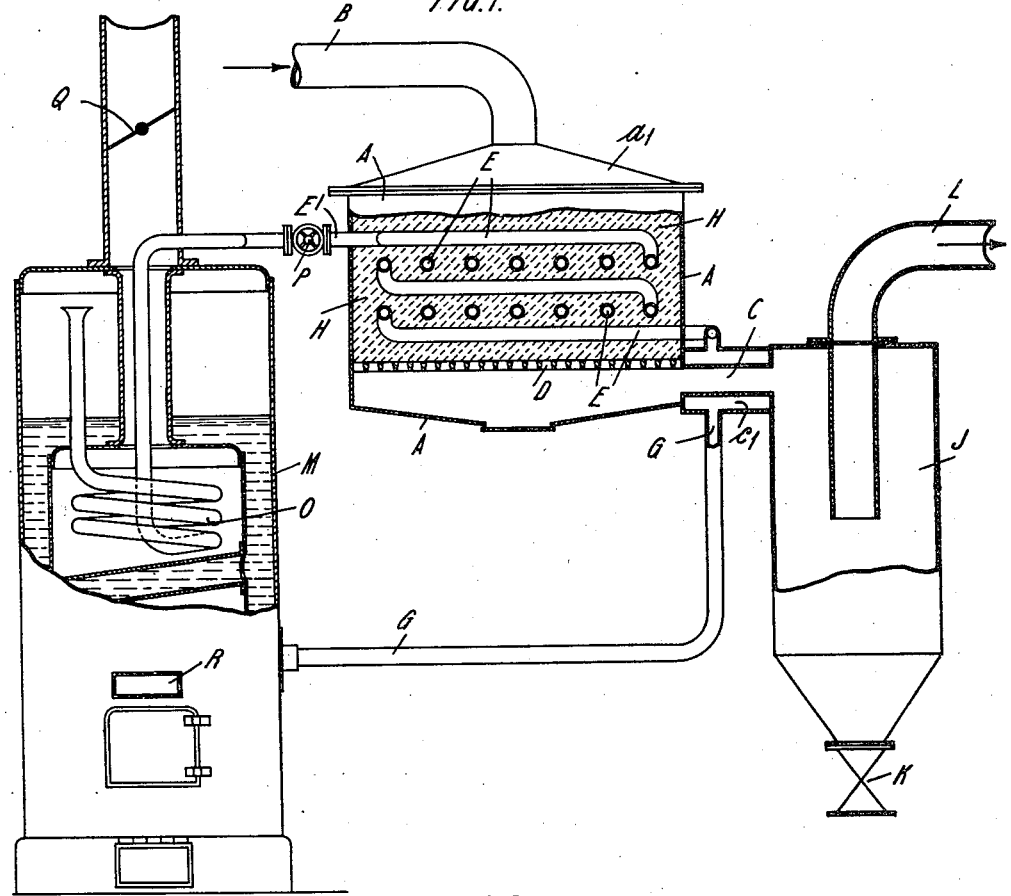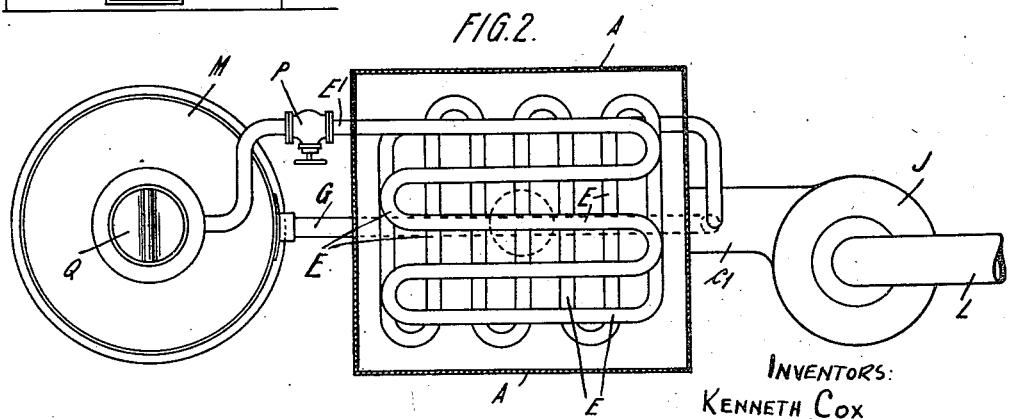

1,453,754

UNITED STATES PATENT OFFICE.

KENNETH COX, OF PUTNEY, LONDON, ROBERT PRICE KERR, OF GATESHEAD-UPON-TYNE, AND ERNEST JOCELYN BATY, OF LUTON, ENGLAND.

APPARATUS FOR GAS PURIFICATION.

Application filed March 3, 1923. Serial No. 622,684.

*To all whom it may concern:*

Be it known that we, KENNETH COX, ROBERT PRICE KERR, and ERNEST JOCELYN BATY, all subjects of the King of Great Britain, residing, respectively, in Putney, London, England; Gateshead-upon-Tyne, in the county of Durham, England; and Luton, in the county of Bedford, England, have invented certain new and useful Improvements in Apparatus for Gas Purification, of which the following is a specification.

This invention relates to apparatus for gas purification, according to which the sulphuretted hydrogen and (or) sulphur dioxide in the gas is or are removed and sulphur recovered, the gas to be purified being passed through a bed of contact material consisting of bog iron ore or other oxide of iron or oxide of alumina, manganese and the like, or mixtures of these, the contact material being heated by the reaction and the sulphur compound being decomposed, with the resulting formation of elemental sulphur, which is recovered; and the term "contact material" as used herein and in the statement of claim hereto is to be understood to refer to any suitable substance such as the above which will give the desired reaction; and the object of the present invention is to improve the apparatus in which the purification process is carried out, particularly in respect to the mode of controlling the temperature of the reaction in the contact material, so that with moderate temperatures and small temperature gradients, a high and uniform efficiency is maintained.

According to the invention, this object is accomplished by controlling the temperature of the reaction in the contact material by means of suitable heat exchanging surfaces so disposed in the bed of contact material that on one side the said surfaces are in contact with the said material and on the other side are in contact with an attemperating fluid; the said surfaces being so distributed throughout the bed of contact material that, whilst the latter is divided into comparatively small sections each subjected to the action of the attemperating fluid, the aggregate cross-sectional area of material, normal to the direction of flow of the gases, is considerable, whereby the transfer of heat through the said surfaces either to or from the said material, in conjunction with the heat evolved by the reaction itself, maintains a uniform temperature of reaction throughout, sufficiently high to prevent any substantial deposition of sulphur in the contact material, and to ensure the sulphur being carried away from the reaction zone in the effluent gases, and sufficiently low to maintain it in the elemental state.

The heat exchanging surfaces may conveniently be pipes arranged in zig-zags or coils embedded in the contact material, through the interior of which pipes the attemperating fluid flows, the pipes being distributed throughout the material so that the latter is divided into comparatively small sections each subject to the action of the attemperating fluid, and the gases to be treated pass through these sections in parallel streams; this arrangement is found to give very good results but any other arrangement of heat transmitting surfaces may be employed which will provide a comparatively large aggregate sectional area transversely to the flow of gases.

Steam may conveniently be employed as an attemperating fluid, in which case the heat transmitting surfaces may on one side be an extension of the steam space of a steam generator to which the condensed water returns; in cases where the composition of the gases to be treated require it liquids having a boiling point higher than that of water may be employed; or flue gases suitably controlled by a damper may be arranged to pass through the heat exchanging surfaces.

The heat exchanging surfaces are utilized at the commencement of the process to heat the oxide and (or) the gas so as to provide at once the temperature necessary to ensure the required degree of purification and to carry off the sulphur with the effluent gas instead of depositing it in the oxide or contact material, thus obviating the necessity for a prolonged passage of heated gas through the apparatus, (without resultant purification) at the commencement of operations.

The contact material may, as stated, be any of the known materials suitable for the purpose such as oxides of iron, alumina, manganese or the like or mixtures of these.

The object of the invention being to maintain the temperatures of the reaction zone within the desired temperature limits so as to ensure the decomposition of the sulphuretted hydrogen and its elimination from the reacting zone as elemental sulphur, it will be understood that if, owing to the evolution of heat by the reaction or other causes, the temperature tends to rise unduly, e. g., to such a temperature as to cause the recombination of the elemental sulphur, the optium temperature must be maintained by abstracting instead of by adding heat.

Our process is generally applicable for purifying gas containing sulphuretted hydrogen and is particularly suitable for the purification of gases having a comparatively low content thereof, say as low as 0.1 per cent, by volume; in purifying a gas having a low sulphuretted hydrogen content, the heat evolved as a result of the reaction itself is comparatively small, and in order to maintain a steady reaction temperature required according to the invention, it is necessary with such a gas to add continuously, by means of the heat exchanging surfaces, more or less heat as may be required. Where the sulphuretted hydrogen content is such that the heat evolved in the reaction itself is, theoretically, that necessary to maintain the temperature at or about the desired value, the heat exchanging surfaces are subjected to an attemperating fluid of suitable temperature which has a steadying value and compensates for the fluctuations in atmospheric conditions and in the character of the gas to be purified. Where the sulphuretted hydrogen content is substantially higher than 1 per cent, the temperature of the reaction tends to rise to a value which converts the sulphur into sulphur di-oxide which is undesirable, and in purifying such gases the heat exchanging surfaces are used to extract heat from the zone of reaction.

Where by reason of the low content of sulphuretted hydrogen in the gas, the heat to be added to maintain the desired temperature is considerable, the said heat may be added to the gas as it enters the reaction zone by heat exchanging surfaces which may conveniently transfer heat from the outgoing to the incoming gas; and the heat exchanging surfaces in contact with the contact material may be used to deal with the transfer of the balance of heat necessary, by reason of variations from time to time in atmospheric conditions or in the sulphur content of the gas, to maintain a steady temperature.

We find that the maintenance of an even steady temperature of reaction very considerably increases the efficiency of the process, the catalytic value of the contact material being under such circumstances very marked; the effect of this increased efficiency being to reduce to a minimum the quantity of contact material necessary.

Provision is made, say by extending the heat exchanging surfaces into the gas outlet passage-way from the space in which the reaction takes place, to ensure that the sulphur will remain in vapourized and (or) suspended condition until it enters the first condensing or collecting apparatus.

The temperature by which the operation is controlled may conveniently be that of the attemperating medium determined as follows:—The effluent gases are tested for purity and when the desired degree of purity is reached, the temperature of the attemperating medium corresponding with this degree is ascertained, and this temperature is then maintained either by hand regulation or by the use of automatic devices such as thermostats or the like. The temperature of the effluent gas is usually maintained as low as is consistent with the prevention of any substantial deposition of sulphur in the oxide.

The sulphur may be separated from the effluent gas by any suitable means, say by passing the gas tangentially into a cyclone apparatus in which the sulphur is separated from the gas by condensation and by centrifugal force, and from which it can be drawn off from time to time.

Where the nature of the gas to be purified requires it, air is usually supplied to the gas as it enters the reaction chamber, so as to provide the oxygen necessary for the reaction. In selecting a contact material from the range of substances described, the nature of the gas to be purified will naturally have to be taken into consideration, and care is taken to select a contact substance in which there will be a minimum of permanent sulphiding and one which will be immune from so-called poisons which affect the efficiency of the catalytic substances.

We have illustrated, by way of example, an apparatus suitable for carrying out our invention, in the accompanying drawings which are diagrammatic; the precise form of the apparatus and the details of construction being such that those skilled in such matters would have no difficulty in installing a plant to meet requirements; in the drawings:—

Fig. 1 is an elevation partly in section, and

Fig. 2 is a plan view with the cover and contact material removed.

The container A which may be of any suitable shape is usually constructed of cast iron but any suitable material may be employed; it may be lagged to prevent heat exchanges with the outer atmosphere; the container is fitted with a cover $a^1$ and the gas inlet B may be formed on the cover, as shown, or be independent of the latter. C is the outlet for the effluent gas.

At a suitable distance from the bottom of the receiver a grating D is fitted (which for clearness is not shown in the plan) which grating supports the contact material H. Before the contact material is introduced the heat exchanging surfaces E are fitted; in the example illustrated these consist of piping arranged in coils or zig-zags so as to form several layers, five being shown in the drawings, the straight parts in the successive layers being disposed at right angles.

The contact material H, say bog iron ore, is filled in so that the heat transmitting surfaces are embedded in it as shown. The attemperating medium is fed in at the inlet end E' and leaves by the outlet pipe G; the effluent gas outlet C is provided with an annulus or jacket $c^1$, and the attemperating medium on its way to the outlet G passes through the said jacket and tends to maintain the desired temperature of the effluent gas.

J is a sulphur collecting chamber and may be of the well known cyclone type, K being the sulphur discharge valve, and L the purified gas outlet pipe.

Where it is desired to raise the temperature of the contact bed the temperature of the heating medium may be raised by various methods such as (a) The supply of live steam from a main boiler at the inlet E' of the coil E, and the connection of the outlet G of the coil to a steam trap.

(b) The supply of steam from a small boiler or heated coil for use on the purifying plant alone, the condensed water flowing back from the outlet G by gravity to the said boiler or heated coil.

(c) The circulation of hot water through the coil either by thermo-syphon action or by positive means.

(d) The circulation of liquids other than water, preferably those having a high boiling point such as certain oils obtained from the low temperature carbonization process.

(e) The supply to the inlet E' of vapour obtained from the boiling of such liquids as described in (d) the condensate flowing back to the boiler through the outlet G.

The object of using such a liquid or its vapour as in (d) or (e) in preference to water and steam, is that a high temperature may be maintained without a corresponding high pressure.

In some cases we may employ flue gases of suitable temperature from a furnace quite separate from the heat exchanging surfaces and so arranged that the flow of the flue gases through the said surfaces can be effectively regulated; where heat has to be continuously abstracted from the reaction zone, the attemperating fluid may be any suitable liquid or fluid, say water, maintained at the appropriate temperature.

The means illustrated by way of example for supplying and circulating the attemperating fluid, comprise a vertical boiler M fitted with a superheater coil O, through which coil the steam generated passes on its way to the inlet E' of the heat exchanging surfaces E, the outlet G from the said surfaces being connected to the water space of the boiler, so that the water formed by the condensation of the steam as it parts with its heat flows back to the steam generator. The desired temperature is maintained by controlling, by means of a valve such as P, the quantity of fluid supplied, or by controlling the temperature of the said fluid by regulating the furnace temperature by means of a damper Q, the admission of air above the fire through the air regulator R, or by any other suitable means.

The gas enters the container A, at B, and passes through the contact material H, where the desired reaction takes place, and the outlet gas now containing sulphur in elemental form, passes through the outlet C into the "cyclone" or other separator J. The sulphur is there separated from the gas partly by condensation and partly by centrifugal action, and may be removed from time to time through the valve K.

The gas now free from sulphur passes away through the outlet pipe L. Under certain conditions it may be necessary to install a second or third "cyclone" in series to extract the last traces of sulphur.

Several units such as the one illustrated, may be provided, the gases being passed through them either in series or in parallel, as may be required.

In the apparatus illustrated by way of example, the heat exchanging surfaces are shown as pipes embedded in the contact material; the same result may be obtained by arranging the heat exchanging surfaces in cellular or honey-comb form, as in radiators for cooling circulating water, the gases to be purified passing in parallel streams through the one set of passageways containing the contact material, and the attemperating fluid being circulated through spaces bounded by the walls of the said passage-ways, which walls form the heat exchanging surfaces, several cellular units of this type being embedded, if necessary, in the one bed of contact material.

A heat exchanger may be interposed between the incoming and outgoing gases, so that the heat of the latter may be transferred to the former.

For purifying a volume of gas of one million cubic feet per day according to the ordinary methods of gas purification, it would be necessary to employ at least four oxide boxes, each measuring 25 feet square, whereas, according to this invention the same volume of gas can be purified by passage through a single box measuring 6 feet square with a proportionate reduction of space occupied and cost of erection.

Having now fully described our invention, we declare that what we claim and desire to secure by Letters Patent is:—

In apparatus for purifying gas by the removal of sulphur compounds and for the recovery of sulphur, the combination of;— a containing vessel having an inlet for the gas to be treated and an outlet for the treated gas; a bed of contact material arranged across the path of flow of the gas from the inlet to the outlet; hollow heat exchanging surfaces embedded in the said material; means for supplying an attemperating fluid to the interior of the heat exchanging surfaces; means for separating the sulphur from the effluent gas; a passageway connecting the outlet from the vessel to the inlet of the said separating means; and a jacket space surrounding the said passageway through which the attemperating liquid is circulated.

In witness whereof we have set our hands in presence of two witnesses.

KENNETH COX.
ROBERT PRICE KERR.
ERNEST JOCELYN BATY.

Witnesses:
CHARLES WEBSTER,
CAIRUS PALMER.